(12) United States Patent
Stefani et al.

(10) Patent No.: US 11,155,407 B2
(45) Date of Patent: Oct. 26, 2021

(54) DEVICE FOR SEISMIC ISOLATION OF STRUCTURES

(71) Applicant: MODULA S.P.A., Casalgrande (IT)

(72) Inventors: Franco Stefani, Modena (IT); Stefano Cassani, Bologna (IT)

(73) Assignee: MODULA S.P.A., Casalgrande (IT)

( * ) Notice: Subject to any disclaimer, the term of this patent is extended or adjusted under 35 U.S.C. 154(b) by 0 days.

(21) Appl. No.: 15/999,622

(22) PCT Filed: Feb. 17, 2017

(86) PCT No.: PCT/IB2017/000126
§ 371 (c)(1),
(2) Date: Aug. 20, 2018

(87) PCT Pub. No.: WO2017/141105
PCT Pub. Date: Aug. 24, 2017

(65) Prior Publication Data
US 2019/0077596 A1      Mar. 14, 2019

(30) Foreign Application Priority Data

Feb. 19, 2016   (IT) .................. 102016000017197

(51) Int. Cl.
*B65G 1/02* (2006.01)
*E04H 9/02* (2006.01)
*F16F 15/04* (2006.01)

(52) U.S. Cl.
CPC .............. *B65G 1/02* (2013.01); *E04H 9/021* (2013.01); *F16F 15/04* (2013.01); *B65G 2207/20* (2013.01)

(58) Field of Classification Search
CPC ...... B65G 1/02; B65G 2207/20; E04H 9/021; F16F 15/04
See application file for complete search history.

(56) References Cited

U.S. PATENT DOCUMENTS

| | | | | |
|---|---|---|---|---|
| 2,425,566 A | * | 8/1947 | Robinson ................ | F16F 1/445 267/140.3 |
| 2,936,139 A | * | 5/1960 | Lindstrom .............. | B41J 29/06 248/362 |
| 3,477,674 A | * | 11/1969 | Schaller ................... | F16F 1/44 248/615 |
| 3,806,975 A | * | 4/1974 | Fyfe ...................... | E01D 19/047 14/73.5 |

(Continued)

FOREIGN PATENT DOCUMENTS

WO   WO 2008/049836 A2   5/2008
WO   WO-2015068964 A1 *  5/2015 .......... E01D 19/042

OTHER PUBLICATIONS

Machine Translation of WO 2015068964 (Year: 2020).*

*Primary Examiner* — James M Ference
(74) *Attorney, Agent, or Firm* — Arent Fox LLP

(57) ABSTRACT

A seismic isolation device for structures of the type in which the structure to be isolated is provided with at least one support leg is constrained to the same structure, includes at least a support element or pad adapted to rest on a sliding surface with a deformation, and includes a contact area in contact with said sliding surface whose extension is variable and depends on the load resting on the support. The sliding surface is rigid and the contact area in contact therewith has a variable extension and depends on the load resting on the support.

11 Claims, 4 Drawing Sheets

(56) References Cited

U.S. PATENT DOCUMENTS

| | | | | |
|---|---|---|---|---|
| 3,921,240 A * | 11/1975 | Fyfe | E01D 19/047 | 14/73.5 |
| 4,187,573 A * | 2/1980 | Fyfe | E01D 19/041 | 14/73.5 |
| 4,320,549 A * | 3/1982 | Greb | E01D 19/046 | 14/73.5 |
| 4,644,714 A * | 2/1987 | Zayas | E04H 9/021 | 248/562 |
| 5,042,765 A * | 8/1991 | Widerstrom | A47B 91/04 | 248/188.3 |
| 5,165,636 A * | 11/1992 | Grissom | A47C 3/029 | 248/188.3 |
| 5,461,835 A * | 10/1995 | Tarics | E04H 9/021 | 248/632 |
| 5,597,240 A * | 1/1997 | Fyfe | E01D 19/041 | 14/73.5 |
| 5,599,106 A * | 2/1997 | Kemeny | E04H 9/023 | 384/36 |
| 5,761,856 A * | 6/1998 | Kishizono | E04H 9/022 | 52/167.7 |
| 5,867,951 A * | 2/1999 | Yaguchi | E04H 9/021 | 52/167.4 |
| 5,934,029 A * | 8/1999 | Kawai | E04H 9/023 | 52/167.1 |
| 6,021,992 A * | 2/2000 | Yen | E04H 9/021 | 248/560 |
| 6,085,473 A * | 7/2000 | Teramachi | E04H 9/023 | 52/167.1 |
| 6,164,022 A * | 12/2000 | Ishikawa | B23Q 1/48 | 52/167.1 |
| 6,321,492 B1 * | 11/2001 | Robinson | E02D 27/34 | 52/167.1 |
| 6,336,296 B1 * | 1/2002 | Ishibashi | E04F 15/02405 | 52/167.1 |
| 6,505,806 B1 * | 1/2003 | Glaesener | F16F 7/00 | 248/638 |
| 6,554,542 B2 * | 4/2003 | Mano | E02D 27/34 | 405/251 |
| 6,820,380 B2 * | 11/2004 | Tsai | E01D 19/04 | 248/636 |
| 7,472,518 B2 * | 1/2009 | Tsai | E04H 9/023 | 248/562 |
| 7,716,881 B2 * | 5/2010 | Tsai | E04H 9/023 | 248/636 |
| 7,886,489 B2 * | 2/2011 | Tubota | F16F 15/021 | 52/167.4 |
| 7,971,692 B2 * | 7/2011 | Gebelin | E04H 9/023 | 188/378 |
| 2002/0166301 A1 * | 11/2002 | Kim | E04H 9/023 | 52/274 |
| 2004/0131287 A1 * | 7/2004 | Lee | E04H 9/023 | 384/36 |
| 2005/0086877 A1 * | 4/2005 | Bloch-Fortea | E04H 9/023 | 52/167.1 |
| 2005/0217879 A1 * | 10/2005 | Xiong | A47B 91/04 | 174/17 CT |
| 2005/0241245 A1 * | 11/2005 | Tsai | E04H 9/023 | 52/167.1 |
| 2006/0174555 A1 * | 8/2006 | Zayas | E04H 9/023 | 52/167.4 |
| 2006/0237378 A1 * | 10/2006 | Pellegrino | A47F 5/0018 | 211/29 |
| 2010/0095608 A1 * | 4/2010 | Marioni | E04H 9/023 | 52/167.4 |
| 2013/0000226 A1 * | 1/2013 | Sugita | E04H 9/021 | 52/167.7 |
| 2014/0026498 A1 * | 1/2014 | Quaglini | E01D 19/046 | 52/167.4 |
| 2015/0122969 A1 * | 5/2015 | Sugita | E02D 27/38 | 248/562 |
| 2015/0191881 A1 * | 7/2015 | Kim | F16C 13/04 | 384/36 |
| 2015/0191906 A1 * | 7/2015 | Kochiyama | E04B 1/98 | 52/167.7 |
| 2015/0225975 A1 * | 8/2015 | Sugita | F16F 15/02 | 52/167.1 |
| 2019/0077596 A1 * | 3/2019 | Stefani | B65G 1/02 | |

* cited by examiner

40

41

DEVICE FOR SEISMIC ISOLATION OF STRUCTURES

The object of the present invention is a seismic isolation device for structures. Its application is very wide since it can be used for residential structures as well as load for bearing structures or machines and in particular, for shelves and warehouses. More in detail, it is usefully applied in a seismic isolation intended to contain and lessen the harmful effects of the transverse accelerations, i.e. accelerations which act parallel to the ground, to the subject structure, in particular if it has a considerable vertical extension.

Various types of devices are known, among which the so-called pendulum, which is used especially for buildings and is composed schematically of a plastic pad sliding in a spherical, stainless steel seat. The denomination "pendulum legs" is due to the fact that, in case of an earthquake, they make oscillate the supported structure. This oscillation, inter alia, has a characteristic according to which, within certain limits, it is approximately independent from the structure mass.

Actually, the oscillation period of the structure and the maximum transverse acceleration are conditioned by the friction coefficient between the pad and the spherical seat.

The friction coefficient between the plastic materials and steel is affected by the suspended mass and depends considerably on the average contact pressure between the pad and the sliding surface.

This variability of the friction coefficient is particularly important in all those cases in which the suspended structure is subject to strong variations of the total weight. For example, this is the case of the warehouse structures, which are usually considerably tall with respect to their base surface resting on the ground.

In these cases it is observed that the behaviour with respect to the transverse seismic isolation can be different in the case of light load condition, as it could occur with an empty or almost empty storehouse, and the opposite case of the loaded storehouse. In case of a light load, when an earthquake occurs, the high structures, whose height is often dozens of times their minimum transverse plan dimension, could be subjected to transverse accelerations which, being generated by a high value of the friction coefficient, imply a serious risk of toppling over sidewise. In the opposite case, with a heavy load, significant relative lateral movements could occur between the ground and the structure caused by a reduced value of the friction coefficient.

It is the object of the present invention to obviate the problems and drawbacks of the prior art by introducing seismic isolation devices which are capable of minimizing the differences of behavior of known seismic isolation devices of the structures as the whole load supported by the structures is varying.

This and other objects have been obtained by the present invention as it has been described and claimed hereinafter.

The characteristics of the present invention will become more apparent from the following description of some of its embodiments, which are illustrated by way of non-limiting examples with the help of the enclosed figures, in which.

Figure 1:
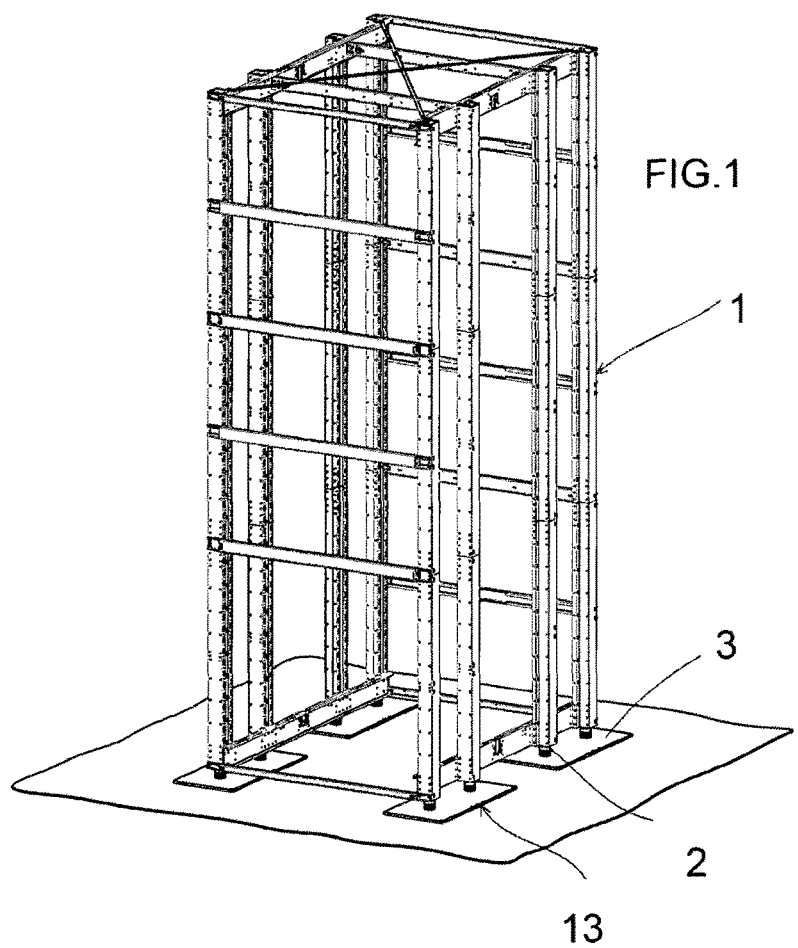
FIG. 1 shows a schematic perspective view of a first embodiment of the invention as a whole.
Figure 2:
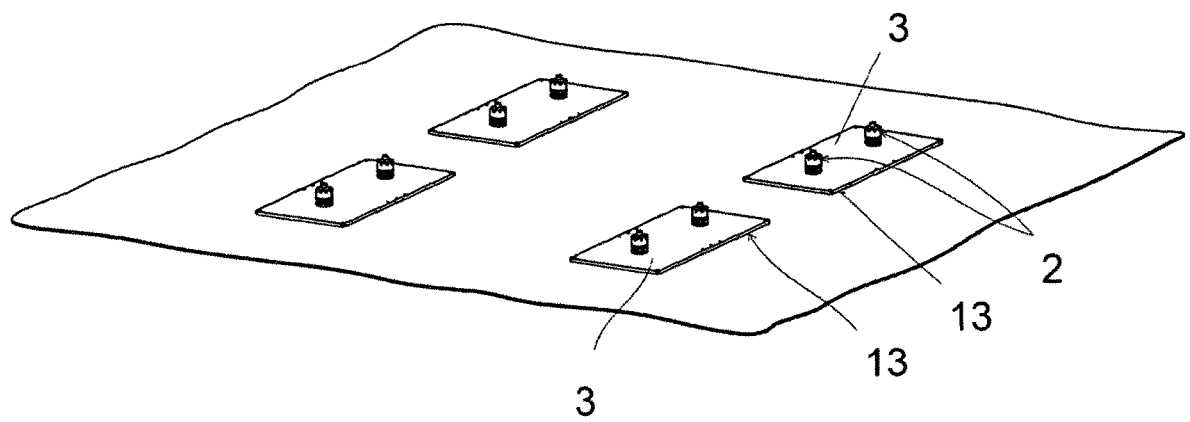
FIG. 2 shows a schematic perspective view of a part of FIG. 1, which shows the configuration of the support legs carrying the structure 1.

With reference to the above mentioned Figures, the reference numeral 1 indicates a structure of a storehouse as a whole. The structure is provided with support legs 2, which are made integral with the structure 1 and rest on the sliding surfaces 3 made on the sheets 13.

Each support leg 2 is fastened to the lower part of the structure 1 and comprises at least a support element or pad which is adapted to rest on a sliding surface 3 with a deformation, and includes a contact area set in contact with the sliding surface 3, and whose extension is variable and depends on the load supported by the leg.

The sliding surface 3 is rigid. Furthermore, it is preferably flat. The support legs 2 rest simply on the sliding surface 3. Each of the support legs comprises at least one said support element or pad made of plastic or polymeric material. Plastic materials suitable for the application are those with low value of friction coefficient, high wear resistance, high load capacity even at high temperatures. UHMWPE (ultra-high-molecular-weight polyethylene), (simple or filled) PTFE, PA6 or PVDF can be mentioned as non-limiting examples of such materials. The area of said support element or pad made of polymeric plastic material destined to touch the sliding surface is not flat.

Actually, it is configured to assume a variable extension, which depends on the load carried by the support leg, substantially in proportion to the load applied to exert an average contact pressure as constant as possible when the load is varying.

Figure 3:
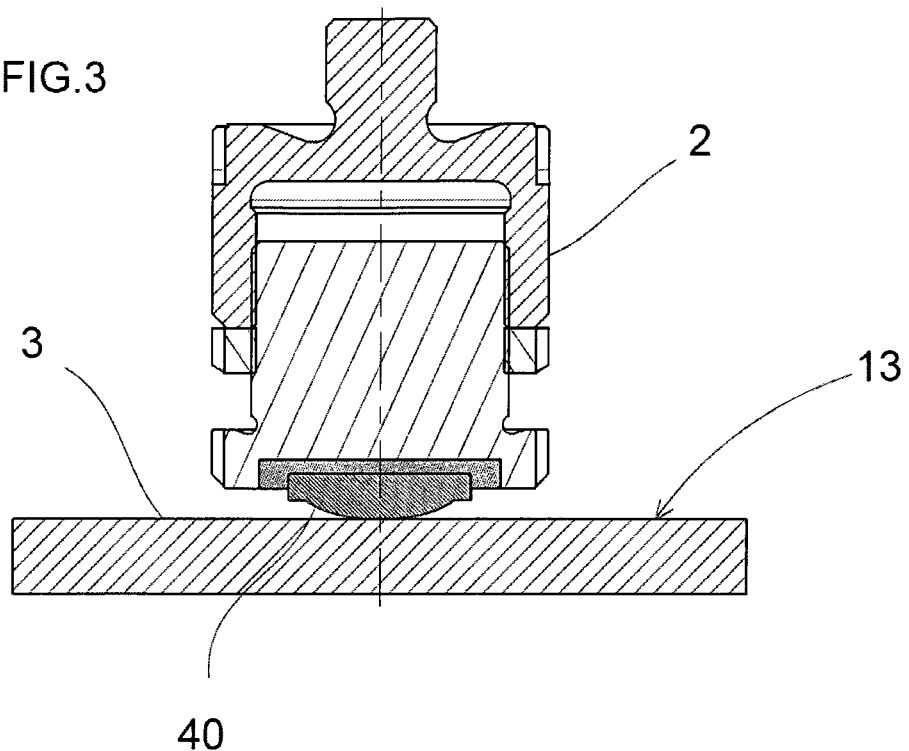
FIGS. 3 and 4 show corresponding cross sections taken along axial vertical planes of two different embodiments of the support legs 2.

In particular, in the embodiment of FIG. 3, the contact area of said support element or pad made of plastic or polymeric material with said sliding surface 3 is indicated as a whole with 40 and is convex.

In another embodiment (not shown), the contact area of said support element or pad can be so shaped as to present more convex areas.

Figure 4:
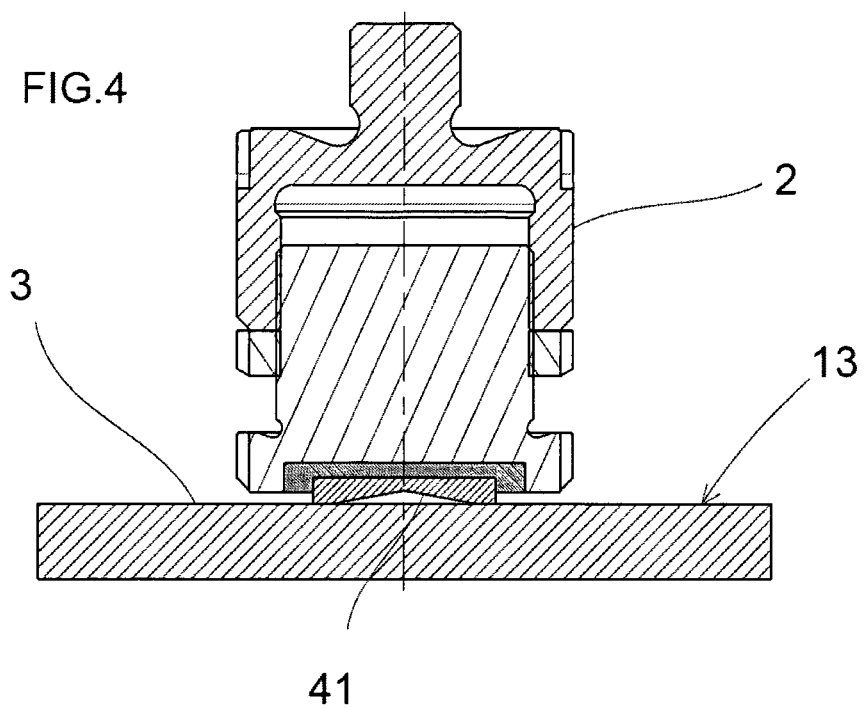

In the embodiment of FIG. 4, the contact area of said support element or pad 41 made of plastic polymeric material, in contact with said sliding surface 3 is concave.

In another embodiment (not shown), the contact area of said support element or pad can be shaped so as to present more concave areas.

In the embodiments shown herein, the fact that the resting area of the element is not flat, but convex or concave, serves the purpose of exploiting first the deformability of the material, thus allowing the contact area to vary on the basis of a variation of the weight carried by each single support. If the increase of the force acting on the single leg results in the increase of the contact area, the variation of the average pressure on the support can be limited. It means that the friction coefficient is not particularly affected by the variations of the load of the structure and consequently, the differences in behaviour to transverse accelerations in different load conditions of the suspended structure are considerably reduced.

Figure 5:
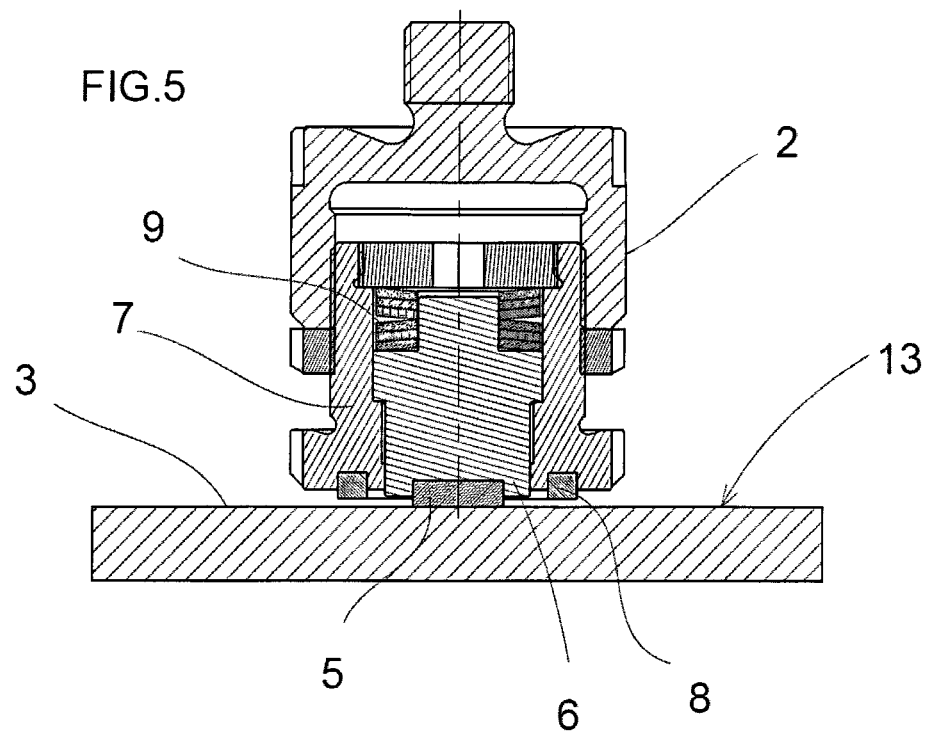
FIGS. 5 and 6 show as many cross sections taken along axial vertical planes of other two embodiments of the support legs 2.
Figure 6:
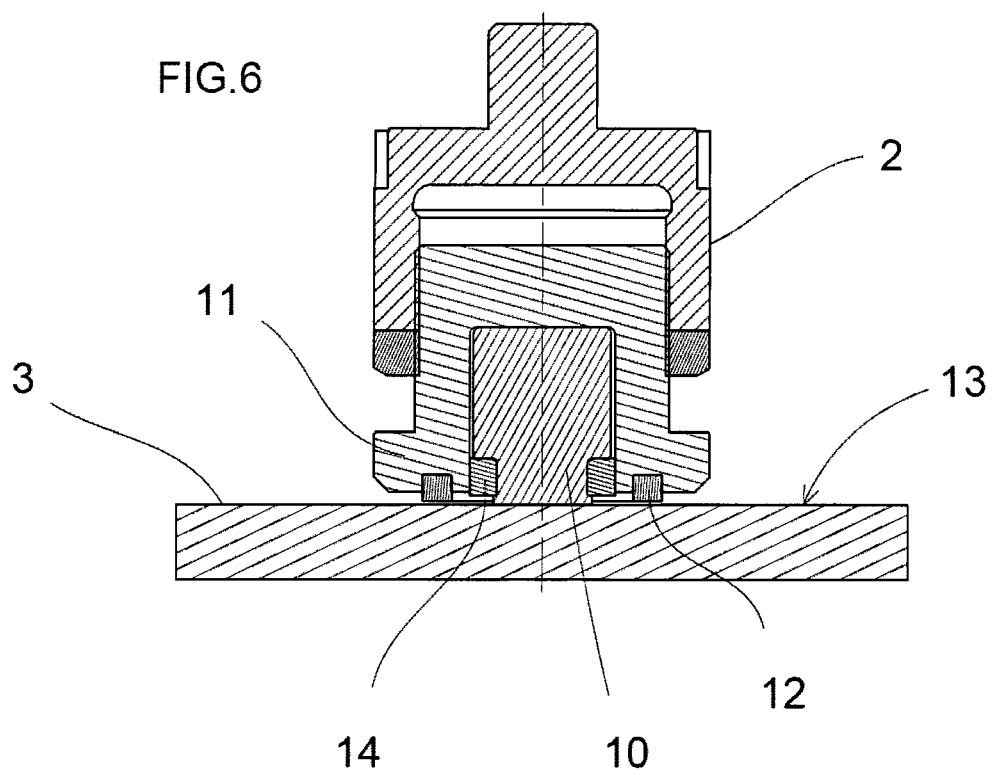

In the embodiment illustrated in FIG. 5, the support element or pad made of plastic or polymeric material is composed of a first pad 5, that is supported by a first supporting element 6, which is guided so as to slide vertically inside a second cylindrical supporting element 7 that in turn is integral to the support leg 2, and is provided with a second pad 8 which has generally annular shape.

The supporting element 6, to which the first pad 5 is fastened, is axially constrained to the second tubular cylindrical supporting element 7 by elastic means 9. The latter are preferably composed of a stack of Belleville spring washers set in the prefixed way so as to begin to act when a prefixed value of the total load is reached, and, in particular, in such a way that the second annular pad 8 interacts with the sliding surface 3.

According to another embodiment, the support element or pad made of plastic or polymeric material is composed of a first resilient pad 10, which is housed inside a rigid support element 11 in coaxial relation thereto. The first elastic pad acts as a spring and the rigid support element 11 is fastened to the support leg 2 and equipped with another annular pad 12.

In this case, it is the whole body of the resilient pad 10 that compresses itself and triggers the action of another annular pad 12 when a prefixed value of the total load is reached.

A collar 14 acts to contain laterally the first pad 10 near the contact and sliding area 3 of the sheet 13.

In both illustrated embodiments, the resilient elements are set on the basis of at least two load values of the suspended structure: the maximum total load situation and the situation in which the load is the weight of the empty structure.

Figure 7:
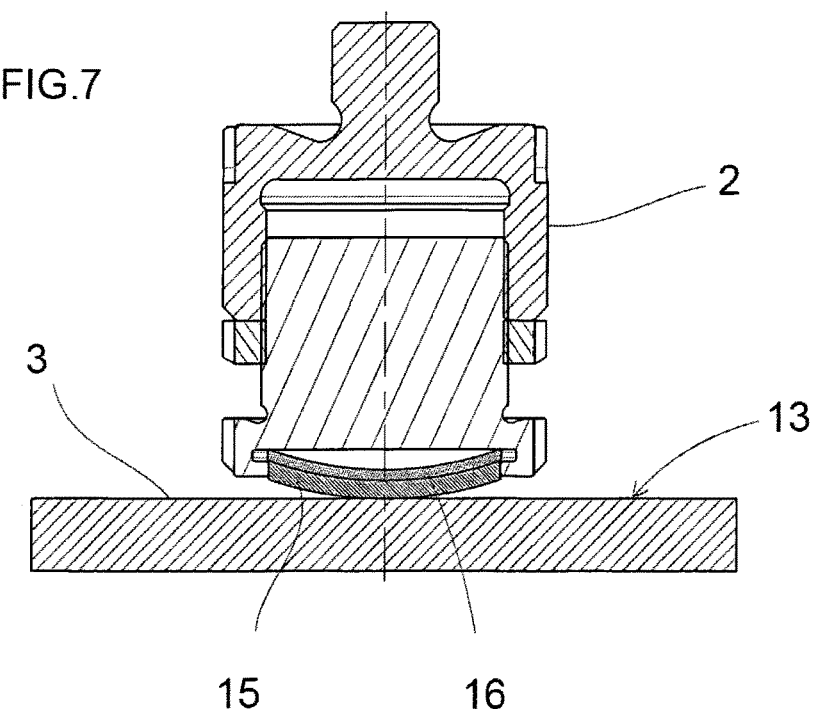
FIG. 7 shows an axial section taken along a vertical axis of another embodiment of the support legs 2.
Figure 8:
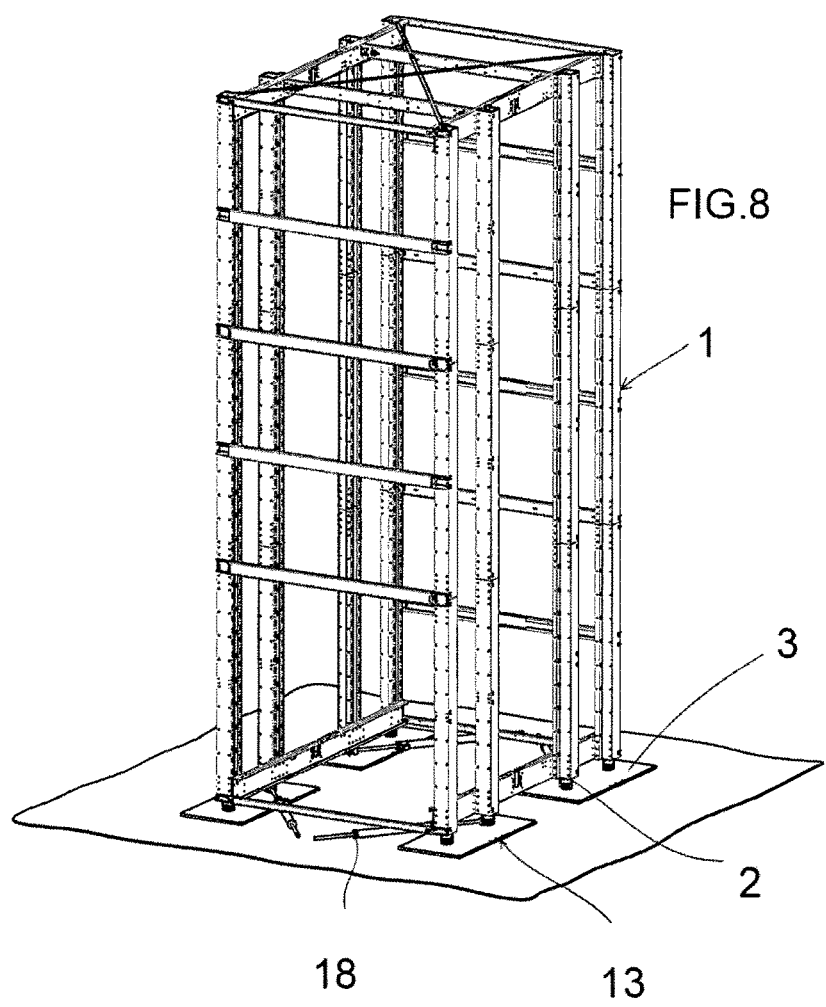
FIG. 8 shows a schematic perspective view of the application of FIG. 1 as a whole, which points out elastic return means, intended for bringing the structure back to its initial position.

In the embodiment illustrated in FIG. 7, the contact area of said support element or pad 2 is delimited by a composite structure consisting of a relatively thin layer 15 of plastic or polymeric material, which is integrally joined at the convex part of a layer or sheet 16, by which it is structurally supported and held.

The layer or sheet 16 is made of a resistant and deformable material, for example steel, and is fastened to the support leg 2 at the edges of its convex part.

The layer or sheet 16 is dimensioned and structurally conformed in such a way as to have a prefixed deformability depending on the minimum and maximum loads it has to support.

Moreover, it is elastically deformable.

Also in this embodiment, the increase of the force acting on the single leg results in the increase of the contact area also due to the elastic flexural deformation of the layer or sheet 16. This allows to limit the variation of the average pressure exerted on the support. This means that the friction coefficient is not particularly affected by the variations of the load of the structure and, consequently, the differences in behaviour to transverse accelerations in different load conditions of the suspended structure are considerably reduced.

In its various illustrated embodiments, the invention allows an effective adjustment of the friction force between the pads of the supports and the respective sliding surfaces, thus limiting the transverse seismic actions on the bearing structure, in particular in vertical warehouses, which are particularly at risk of lateral toppling.

Another advantageous characteristic of the invention derives from the fact that it provides more support legs on the same sheet 13, in such a way that at least two adjacent support legs, in particular those situated on the short base side of the structure, have a wide sliding surface without obstacles.

The whole structure is advantageously provided with return elastic means 18, which act to bring the structure back to its initial position. These elastic means 18, which act between the structure and the ground and which support the sheets 13, are characterized by a high malleability in a first step of their elongation, so as to provide the minimum resistance to the movements in transverse direction just in this first phase.

The invention claimed is:

1. A structure provided with a device for seismic isolation of the structure, the device comprising:
   at least one support leg constrained to the structure,
   wherein the support leg comprises at least a deformable support element or pad resting on a sliding surface,
   wherein the support element or pad has a contact area in contact with said sliding surface,
   wherein an extension of said contact area varies dependent on a load of the structure resting on the support leg such that an increase of the load results in an increase of the extension of said contact area and a decrease of the load results in a decrease of the extension of said contact area,
   wherein said support element or pad comprises a first pad and a second pad,
   wherein said first pad is supported by a first supporting element and said second pad has an annular shape,
   wherein the first supporting element is axially constrained to a second supporting element by elastic means and guided so as to slide vertically inside said second supporting element, and
   wherein said second supporting element is cylindrical and integral to said support leg.

2. The structure according to claim 1, wherein the support element or pad is made of plastic or a polymeric material.

3. The structure according to claim 2, wherein the contact area of said support element or pad is not flat.

4. The structure according to claim 3, wherein the contact area of said support element or pad is convex.

5. The structure according to claim 4, wherein the contact area of said support element or pad has a plurality of convex areas.

6. The structure according to claim 3, wherein the contact area of said support element or pad is concave.

7. The structure according to claim 6, wherein the contact area of said support element or pad has a plurality of concave areas.

8. The structure according to claim 3, wherein said support element or pad is made of a polymeric plastic material.

9. The structure according to claim 8, wherein the polymeric plastic material is selected from the group consisting of UHMWPE (ultra-high-molecular-weight polyethylene), PTFE, PA6, and PVDF.

10. The structure according to claim 1, wherein the sliding surface is flat.

11. A warehouse comprising a structure and a device for seismic isolation of the structure, the device comprising at least one support leg constrained to the structure,
   wherein the support leg comprises at least a deformable support element or pad resting on a sliding surface,
   wherein the support element or pad has a contact area in contact with said sliding surface, and
   wherein an extension of said contact area varies dependent on a load of the structure resting on the support leg,
   wherein said support element or pad comprises a first pad and a second pad,
   wherein said first pad is supported by a first supporting element and the second pad has an annular shape, wherein the first supporting element is axially constrained to a second supporting element by elastic means and guided so as to slide vertically inside said second supporting element, and wherein said second supporting element is cylindrical and integral to said support leg.

\* \* \* \* \*